US010739491B2

(12) United States Patent
Yang et al.

(10) Patent No.: US 10,739,491 B2
(45) Date of Patent: Aug. 11, 2020

(54) RADIATION INSPECTION SYSTEM AND RADIATION INSPECTION METHOD (71) Applicants: TSINGHUA UNIVERSITY, Beijing (CN); NUCTECH COMPANY LIMITED, Beijing (CN)

(72) Inventors: Yigang Yang, Beijing (CN); Dongyu Wang, Beijing (CN); Hao Yu, Beijing (CN); Quanwei Song, Beijing (CN); Jianmin Li, Beijing (CN); Weizhen Wang, Beijing (CN); Yulan Li, Beijing (CN); Chunguang Zong, Beijing (CN); Qinjian Zhang, Beijing (CN); Ming Zeng, Beijing (CN); Zhiqiang Chen, Beijing (CN); Yuanjing Li, Beijing (CN); Li Zhang, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 114 days.

(21) Appl. No.: 16/232,058

(22) Filed: Dec. 26, 2018

(65) Prior Publication Data
US 2020/0025968 A1 Jan. 23, 2020

(30) Foreign Application Priority Data

Dec. 26, 2017 (CN) .......................... 2017 1 1429492

(51) Int. Cl.
*G01V 5/00* (2006.01)
*G01N 23/20* (2018.01)
*G21K 1/04* (2006.01)

(52) U.S. Cl.
CPC ........... *G01V 5/0025* (2013.01); *G01N 23/20* (2013.01); *G01N 2223/1066* (2013.01); *G01N 2223/316* (2013.01); *G01N 2223/32* (2013.01)

(58) Field of Classification Search
CPC ................ G01N 23/005; G01N 23/20; G01N 2223/1066; G01N 2223/20;
(Continued)

(56) References Cited

U.S. PATENT DOCUMENTS

RE28,544 E * 9/1975 Stein .................... G01N 23/043
378/146
5,493,596 A * 2/1996 Annis .................... G01N 23/10
378/146
(Continued)

FOREIGN PATENT DOCUMENTS

CN 104584137 A 4/2015
CN 103808739 B 6/2016
(Continued)

OTHER PUBLICATIONS

EP Search Report dated Apr. 18, 2019 in the corresponding EP application (application No. 18215790.9).

*Primary Examiner* — Mark R Gaworecki
(74) *Attorney, Agent, or Firm* — Kilpatrick Townsend & Stockton, LLP (57) ABSTRACT

The present disclosure discloses a radiation inspection system and a radiation inspection method. The radiation inspection system comprises a radiation source and a beam modulating device. The beam modulating device comprises a first collimating structure disposed at a beam exit side of the radiation source and a second collimating structure disposed at a beam exit side of the first collimating structure. The second collimating structure is movable relative to the first collimating structure to change a relative position of the first collimating port of the first collimating structure with the second collimating port of the second collimating structure, and the beam modulating device is shifted between a first operational state in which the beam modulating device modulates an initial beam into a fan beam, and a second
(Continued)

operational state in which the beam modulating device modulates the initial beam into a pencil beam variable in position.

20 Claims, 4 Drawing Sheets

(58) Field of Classification Search
CPC ......... G01N 2223/316; G01N 2223/32; G01V 5/0008; G01V 5/0016; G01V 5/0025; G21K 1/04
See application file for complete search history.

(56) References Cited

U.S. PATENT DOCUMENTS

| | | | |
|---|---|---|---|
| 6,269,142 B1* | 7/2001 | Smith | G01N 23/20083 378/160 |
| 9,117,564 B2* | 8/2015 | Rommel | G21K 1/04 |
| 2014/0010351 A1 | 1/2014 | Rommel | |
| 2015/0162658 A1 | 6/2015 | Bowers et al. | |
| 2015/0294748 A1 | 10/2015 | Rommel | |
| 2015/0360051 A1 | 12/2015 | Martin | |
| 2015/0360052 A1 | 12/2015 | Martin et al. | |
| 2015/0372389 A1 | 12/2015 | Chen et al. | |
| 2016/0030769 A1 | 2/2016 | Cameron et al. | |
| 2016/0228728 A1 | 8/2016 | Dempsey et al. | |
| 2017/0038316 A1 | 2/2017 | Belcher et al. | |
| 2017/0172525 A1 | 6/2017 | Proksa et al. | |

FOREIGN PATENT DOCUMENTS

| | | |
|---|---|---|
| CN | 106572823 A | 4/2017 |
| CN | 106604762 A | 4/2017 |
| CN | 107073284 A | 8/2017 |
| CN | 107427691 A | 12/2017 |
| WO | 0137287 A1 | 5/2001 |

* cited by examiner

RADIATION INSPECTION SYSTEM AND RADIATION INSPECTION METHOD

CROSS-REFERENCES TO RELATED APPLICATIONS

The present application claims priority from Chinese application number CN201711429492.6 filed Dec. 26, 2017, which is herein incorporated by reference.

FIELD

The present disclosure relates to the technical field of radiation inspection, and particularly relates to a radiation inspection system and a radiation inspection method.

BACKGROUND

In the field of safety inspection, substance identification, and identification of contraband such as drugs and explosives in particular, are of great significance.

For the detection of explosives concealed in large articles such as containers, two basic conditions are required: strong penetrability, that is, capable of penetrating the iron sheet of a container and reaching certain depth of the inspected object; and capable of obtaining the characteristic information of the explosives, for example, elemental composition.

The principles of substance identification by the radiation inspection system based on X-ray sources consist in identifying with different absorption curves of X-rays of substances with different atomic coefficient elements, and it is necessary to use X-rays having two or more energies to perform simultaneous imaging. This radiation inspection system may distinguish between substances with a high atomic coefficient and substances with a low atomic coefficient, and further distinguish between organics and inorganics.

In addition, contraband may be inspected by a neutron-based radiation inspection system. The neutron has a strong penetrating ability. At the same time, by detecting and analyzing the energy spectrum releasing γ rays after neutrons react with the inspected object, it is possible to detect whether contraband are present or not. The neutron-based radiation inspection system is capable of penetrating large articles and performing elemental analysis. Therefore, the use of a neutron inspection manner to inspect contraband such as explosives or drugs in large articles has great advantages.

In the process of detecting contraband in a neutron inspection manner, elemental analysis techniques are used to judge the elemental composition of organics. Substance identification is performed using the interaction of neutrons and substances, and based on the elemental content characteristics of the contraband and the reaction mechanism of neutrons and nuclei, the elemental composition and proportional relationship of organics such as H, C, N, O and Cl in a substance, to identify the substance and achieve the purpose of inspecting contraband.

Take the inspection of explosives and drugs as an example:

For inspection of explosives, the elemental composition of explosives usually consists in C, H, N and O, and has the characteristics of high content of N and O, and low content of H and C. Whether the explosives are present or not may be detected by detecting and analyzing the energy spectrum of released γ rays after neutrons react with the inspected object.

For inspection of drugs, in the preparation process of many drugs, since it is necessary to involve chlorine-containing substances, such as hydrochloric acid, chloroform, methylene chloride, dichloroethane, and dichloroethylene, chlorine may also be found in many manufactured drugs. By analyzing the proportional relationship of elements such as H, N, and Cl, the possibility of presence and kind of drugs/precursor substances are judged.

In the existing radiation inspection system, some inspect the inspected subject by a fan beam, and some inspect the inspected subject by a pencil beam. However, neither of them can incorporate the inspection efficiency and the inspection accuracy.

SUMMARY

It is an object of the present disclosure to provide a radiation inspection system and a radiation inspection method which aim to incorporate the inspection efficiency and the inspection accuracy.

A first aspect of the present disclosure provides a radiation inspection system, comprising a radiation source for emitting an initial beam and a beam modulating device for modulating the initial beam into a scanning beam, and the beam modulating device comprises a first collimating structure disposed at a beam exit side of the radiation source and a second collimating structure disposed at a beam exit side of the first collimating structure, the first collimating structure comprises a first collimating port, the second collimating structure comprises a second collimating port, the second collimating structure is movable relative to the first collimating structure to change a relative position of the first collimating port with the second collimating port, such that the beam modulating device is shifted between a first operational state in which the beam modulating device modulates the initial beam into a fan beam, and a second operational state in which the beam modulating device modulates the initial beam into a pencil beam variable in position.

In some embodiments of the present disclosure, in the second operational state, the second collimating structure is translatable and/or rotatable relative to the first collimating structure to change an intersecting position of the second collimating port and the first collimating port in a direction perpendicular to an exit direction of the initial beam, thereby changing a position of the pencil beam.

In some embodiments of the present disclosure, the first collimating structure comprises a first collimating plate; and the second collimating structure comprises a second collimating plate.

In some embodiments of the present disclosure, the first collimating plate is a first flat collimating plate, and the second collimating plate is a second collimating flat plate; or, the first collimating plate is a first collimating curved plate, and the second collimating plate is a second collimating curved plate.

In some embodiments of the present disclosure, the first collimating plate is parallel to the second collimating plate.

In some embodiments of the present disclosure, the first collimating port is a first collimating slit; and the second collimating port is a second collimating slit.

In some embodiments of the present disclosure, at least one of the first collimating slit and the second collimating slit is a straight-linear collimating slit.

In some embodiments of the present disclosure, the second collimating slit is disposed obliquely or vertically with respect to the first collimating slit.

In some embodiments of the present disclosure, the first collimating structure is stationary, and the second collimating structure is movably disposed; or, the first collimating structure is movably disposed, and the second collimating structure is stationary; or the first collimating structure and the second collimating structure are movably disposed.

In some embodiments of the present disclosure, the radiation source comprises a neutron source.

In some embodiments of the present disclosure, the neutron source comprises a photoneutron source.

In some embodiments of the present disclosure, the radiation inspection system further comprises a neutron modulating mask, which is disposed at the periphery of the neutron source, to modulate neutrons generated by the neutron source.

In some embodiments of the present disclosure, the neutron modulating mask comprises a moderating layer, which is disposed at the periphery of the neutron source to moderate the neutrons produced by the neutron source.

In some embodiments of the present disclosure, the neutron modulating mask comprises a shielding layer, the shielding layer is disposed at the periphery of the moderating layer and comprises a shielding portion that shields the moderated neutrons and a neutron exit port that is disposed at the beam exit side for emitting the initial beam.

In some embodiments of the present disclosure, the shielding layer is used for shielding gamma rays.

In some embodiments of the present disclosure, the radiation inspection system comprises a detection device and a controller, the detection device is used for receiving photons scattered by an inspected object radiated by the scanning beam, and the controller is coupled to the detection device to receive a detection signal from the detection device and form an inspection result according to the detection signal.

In some embodiments of the present disclosure, the detection device comprises a first detecting module and a second detecting module having an energy resolution higher than the first detecting module, wherein the first detecting module and the second detecting module are used for receiving the photons scattered by the inspected object radiated by the scanning beam; the controller is coupled to the first detecting module to receive a first detection signal from the first detecting module and form a first inspection result according to the first detection signal; the controller is also coupled to the second detecting module to receive a second detection signal from the second detecting module and to form a second inspection result according to the second detection signal.

In some embodiments of the present disclosure, the detection device comprises a first detecting module foreground collimating structure for forming a beam shape of the photons entering the first detecting module; and/or the detection device comprises a second detecting module foreground collimating structure for forming a beam shape of the photons entering the second detecting module.

In some embodiments of the present disclosure, in the second operational state, the second detecting module is fixed in position with respect to the pencil beam in a detecting process.

A second aspect of the present disclosure provides a radiation inspection method for inspecting an inspected subject by using the radiation inspection system according to the first aspect of the present disclosure, comprising: placing the beam modulating device in a first operational state, and scanning the inspected subject by using the fan beam to determine a suspected area to be accurately inspected; and placing the beam modulating device in a second operational state, and accurately scanning the suspected area by using the pencil beam.

In some embodiments of the present disclosure, the radiation inspection system comprises a first detecting module and a second detection having an energy resolution higher than the first detecting module, and the radiation inspection method comprises that: in the first operational state, the first detecting module detects separately, or the first detecting module and the second detecting module detect simultaneously to determine the suspected area; in the second operational state, the second detecting module detects separately, or the first detecting module and the second detecting module detect simultaneously to accurately inspect the suspected area.

Based on the radiation inspection system provided by the present disclosure, by changing a relative position of the first collimating port of the first collimating structure with the second collimating port of the second collimating structure, it is possible to shift the beam modulating device between a first operational state in which the initial beam is modulated into a fan beam and a second operational state in which the initial beam is modulated into a pencil beam variable in position, thereby shifting the radiation inspection system between the fan beam scanning inspection mode and the pencil beam scanning inspection mode. When rapid inspection is required, for example when a suspected area where contraband may be present is investigated, it is possible to work under the fan beam scanning mode. When accurate inspection is required, for example when a suspected area where contraband may be present is inspected, it is possible to work under the pencil beam scanning inspection mode, thereby incorporating the inspection efficiency and the inspection accuracy.

The radiation inspection method of the present disclosure has effects similar to the radiation inspection system of the present disclosure.

Other features of the present disclosure and advantages thereof will become explicit by means of the following detailed descriptions of the exemplary embodiments of the present disclosure with reference to the accompanying drawings.

BRIEF DESCRIPTION OF THE DRAWINGS

The accompanying drawings described herein are used to provide a further understanding of the present disclosure and constitute a part of the present application. The illustrative embodiments of the present disclosure as well as the illustrations thereof, which are used for explaining the present disclosure, do not constitute improper definitions on the present disclosure. In the drawings.

In FIGS. 1 to 5, various reference signs respectively represent:

100. radiation inspection system;
110. radiation source device;
111. neutron source;
112. moderating layer;
113. shielding layer;
114. first collimating structure;
1141. first collimating port;
130. second collimating structure;
131. second collimating port;
140. first detecting module;
150. detector foreground collimating structure;
160. second detecting module;
170. system cabinet;
200. container to be inspected;
210. inspected object;
N1. initial beam;
N2. fan beam;
N3. pencil beam;
R. photons.

DETAILED DESCRIPTION OF THE INVENTION

Next, the technical solution in the embodiments of the present disclosure will be explicitly and completely described in combination with the accompanying drawings in the embodiments of the present disclosure. Apparently, the described embodiments are merely part of the embodiments of the present disclosure, rather than all the embodiments. The following descriptions of at least one exemplary embodiment which are in fact merely illustrative, by no means serve as any delimitation on the present disclosure as well as its application or use. On the basis of the embodiments of the present disclosure, all the other embodiments acquired by a person skilled in the art on the premise that no inventive effort is involved fall into the protection scope of the present disclosure.

Unless additionally specified, the relative arrangements, numerical expressions and numerical values of the components and steps expounded in these examples do not limit the scope of the present disclosure. At the same time, it should be understood that, in order to facilitate the description, the dimensions of various parts shown in the drawings are not delineated according to actual proportional relations. The techniques, methods, and apparatuses known to a common technical person in the relevant art may not be discussed in detail, but where appropriate, techniques, methods, and apparatuses should be considered as part of the granted description. Among all the examples shown and discussed here, any specific value should be construed as being merely illustrative, rather than as a delimitation. Thus, other examples of exemplary embodiments may have different values. It should be noted that similar reference signs and letters present similar items in the following drawings, and therefore, once an item is defined in a drawing, there is no need for further discussion in the subsequent drawings.

In the description of the present disclosure, it is necessary to understand that, such wordings as "first" and "second" which are used to define the parts, are only intended to facilitate distinguishing the corresponding parts. Unless otherwise specified, the aforementioned wordings do not have particular meanings, and thus cannot be understood as limiting the protection scope of the present disclosure.

In the description of the present disclosure, it is necessary to understand that, the azimuth or positional relations indicated by such azimuth terms as "front, rear, up, down, left, right", "transverse, vertical, perpendicular, horizontal" and "top, bottom", which are usually based on the azimuth or positional relations illustrated by the drawings, are only for facilitating description of the present disclosure and simplifying the description. Unless otherwise specified, such azimuth terms do not indicate or imply that the device or element referred to has to present a particular azimuth or to be constructed and operated in a particular azimuth, so that it cannot be understood as limiting the protection scope of the present disclosure. The azimuth terms "within" and "outside" mean the interior and exterior relative to the contour of various members themselves.

As shown in FIG. 1 to FIG. 5, an embodiment of the present disclosure provides a radiation inspection system 100. The radiation inspection system 100 comprises a radiation source for emitting an initial beam and a beam modulating device for modulating the initial beam into a scanning beam. The radiation inspection system 100 further comprises a detection device for detecting photons R scattered by the inspected object radiated by the scanning beam, and a controller coupled to the detection device to receive a detection signal from the detection device and form an inspection result according to the detection signal.

The beam modulating device comprises a first collimating structure 114 disposed at a beam exit side of the radiation source and a second collimating structure 130 disposed at a beam exit side of the first collimating structure 114. The first collimating structure 114 comprises a first collimating port 1141, and the second collimating structure 130 comprises a second collimating port 131. The second collimating structure 130 is movably provided with respect to the first collimating structure 114 to change a relative position of the first collimating port 1141 with the second collimating port 131, such that the beam modulating device is shifted between a first operational state and a second operational state. In the first operational state, the beam modulating device modulates the initial beam into a fan beam. In the second operational state, the beam modulating device modulates the initial beam into a pencil beam, a position of which is variable.

Based on the radiation inspection system 100 provided by the present disclosure, by changing a relative position of the first collimating port 1141 with the second collimating port 131, it is possible to shift the beam modulating device between a first operational state in which the initial beam is modulated into a fan beam and a second operational state in which the initial beam is modulated into a pencil beam having a variable position, thereby shifting the radiation inspection system 100 between the fan beam scanning inspection mode and the pencil beam scanning inspection mode. When rapid inspection is required, for example when a suspected area where contraband may be present is investigated, it is possible to work under the fan beam scanning mode. When accurate inspection is required, for example when a suspected area where contraband may be present is inspected, it is possible to work under the pencil beam scanning inspection mode, thereby incorporating the inspection efficiency and the inspection accuracy.

As shown in FIG. 1 to FIG. 5, in an embodiment of the present disclosure, the radiation source is a neutron source 111. The beam modulating device as a collimating device is used to change the shape and position of the initial beam N1 emitted by the neutron source 111.

The radiation inspection system 100 comprises a neutron modulating mask, which is disposed at the periphery of the neutron source 111 to modulate neutrons generated by the neutron source 111.

The neutron modulating mask comprises a moderating layer 112 and a shielding layer 113. The moderating layer 112 is disposed at the periphery of the neutron source 111 to moderate the neutrons produced by the neutron source 111. The shielding layer 113 is disposed at the periphery of the moderating layer 112, and comprises a shielding portion that shields the moderated neutrons and a neutron exit port that is disposed at the beam exit side for emitting the initial beam N1.

Neutrons have such advantages as to be excellent in penetrating power and capable of elemental analysis. When neutrons react with different elements, photons having different characteristic energy are emitted. Based on the elemental content characteristics of the contraband and the reaction mechanism of the neutrons and the nuclei, by detecting the characteristic γ energy spectrum of the inspected object, the elemental composition of the substance and the proportion of each element may be determined, thereby distinguishing contraband from other substances. Therefore, there possesses the essentials to detect contraband that are concealed in large subjects to be inspected, such as containers and truck coaches. The contraband are, for example, drugs and explosives.

The neutron source 111 may use a neutron source 111 of various forms, such as a photoneutron source, a neutron generator, an isotope source, and the like. In this embodiment, the neutron source 111 is a photoneutron source. The photoneutron source may comprise an electron accelerating tube, an X-ray converting target, and a photoneutron target. The X-ray converting target may be made, for example, of gold and tungsten. The photoneutrons are moderated into thermal neutrons by means of the moderating layer 112.

The photoneutron source may meet the requirements for rapid inspection of large volume articles. For the field of inspecting contraband, inspection efficiency is an important factor. For this reason, for a neutron-based radiation inspection system, it is necessary to ensure that the neutrons within the inspection channel have a high fluence rate, and thus the neutron source used needs to have a high neutron yield. Photoneutrons which have a high yield may improve the detection speed with respect to the neutron generator and the isotopic neutron source. The photoneutron source has a long service life, while the commonly used isotopic neutron source such as 252Cf has a half-life of 2.65 years. An ordinary neutron generator has a service life of only over a thousand hours at the most. The photoneutron source which is an electric ray source, has a favorable radiation safety without radiation produced in the transport, installation and debugging process.

The radiation inspection system 100 according to an embodiment of the present disclosure which uses a photoneutron source as a radiation source may be applied in the field of security inspection to identify contraband such as potential drugs or explosives within large containers and large vehicles.

In the present disclosure, the X-rays produced by the photoneutron source using a pulse electron linac act with the photoneutron target to generate photoneutrons. The process of generating photoneutrons comprises such two processes as X-ray creation and photoneutron generation: the high-Z material as the X-ray converting target is bombarded after a high-energy electron beam is formed by accelerating electrons within the electron accelerating tube, and the electrons and the high-Z material are subjected to a bremsstrahlung action, to produce high-energy X-rays. The high-energy X-rays after entering the photoneutron converting target are subjected to a photoneutron reaction with the nucleus to generate photoneutrons.

In this embodiment, the neutron modulating mask is masked outside the electron accelerating tube, the X-ray converting target, and the photoneutron target. The arrangement which integrates the neutron modulating mask, the electron accelerating tube, the X-ray converting target and the photoneutron target as a whole, makes convenient installation and debugging, as well as low radiation and high safety. In this embodiment, the neutron source 111, the moderating layer 112, the shielding layer 113, and the first collimating structure 114 are integrated together to form the radiation source device 110.

In the present embodiment, the X-ray converting target is entirely located within the photoneutron target. In other illustrated embodiments, the X-ray converting target may be partially located within the photoneutron target, or may be at a distance from the photoneutron target.

Wherein, the photoneutron target may be a heavy water target, or may be a beryllium target. Since the photoneutron reaction has an energy threshold, that is, the photoneutron reaction is likely to occur only when the energy of the photon is greater than the binding energy of the neutron in the nucleus, it is necessary to choose an appropriate photoneutron converting material to form the photoneutron target, so as to ensure that its reaction threshold is lower than the energy of the X-ray. The typically selected materials are deuterium and beryllium, whose photon reaction thresholds are respectively 2.223 MeV and 1.67 MeV. In this embodiment, the photoneutron target is a heavy water target.

The heavy water target comprises a hermetic housing and heavy water enclosed within the hermetic housing. The top of the hermetic housing comprises a recessed portion within which the X-ray converting target is situated. The hermetic housing may be for example an aluminum housing. In this embodiment, the X-ray converting target stretches into the heavy water target, and in the process of electron targeting, the production of the X-ray is encircled by heavy water. At the same time as the X-ray is produced, the X-ray having energy higher than the photoneutron reaction threshold may reacts with deuterium in heavy water to generate neutrons, so that the X-ray is adequately utilized.

In this embodiment, the heavy water target is a cylindrical target having an axis provided along an exit direction of the electron accelerating tube. The electron accelerating tube, the X-ray converting target and the photoneutron target are arranged coaxially.

In this embodiment, the moderating layer 112 of the neutron modulating mask is disposed at the periphery of the neutron source 111 to moderate the photoneutrons produced by the neutron source 111. In this embodiment, the neutron moderating layer 112 is a graphite moderating layer.

In other embodiments not shown, the moderating layer 112 may also be constructed of other materials. For example, it may also be a heavy water moderating layer or may be a combination of different moderating material layers. In the heavy water moderating layer, heavy water is accommodated within the hermetic housing.

The neutrons emitted by the photoneutron source are moderated by the moderating layer 112 into thermal neutrons. Compared to fast neutrons, thermal neutrons have a larger reaction section with the main elements in the contraband.

The shielding layer 113 is disposed at the periphery of the moderating layer 112, and comprises a shielding portion that shields the moderated neutrons and a neutron exit port that is disposed at the beam exit side to transmit neutrons.

In this embodiment, the electron beam of the electron accelerating tube exit axially, and coaxially with the shielding layer 113, and the neutron exit port is disposed at the axial end surface of the shielding layer 113.

In some embodiments not shown, the electron accelerating tube may emit X-rays downwards, while the neutron exit port is disposed lateral to the shielding layer. This arrangement allows that the photoneutron source may be arranged such that the exit direction of the electron beam is directed towards the ground. Since the back side of the electron beam is directed towards the sky, as long as operational staff are not required at the top, there is no need to perform special protection, and moreover, the beam exit direction is directed towards the ground, there is no need to perform special protection as well. Therefore, in this case, the protection requirements for the top and bottom of the photoneutron may be reduced.

Figure 1:
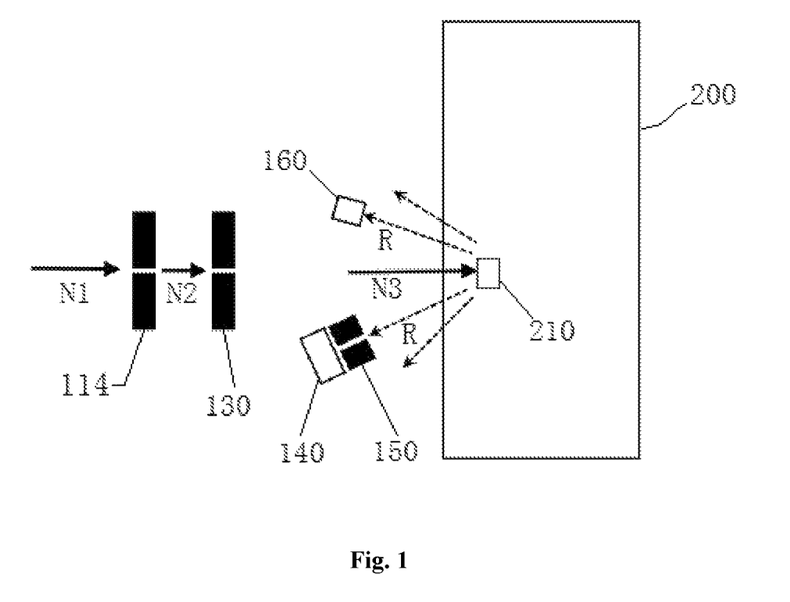
FIG. 1 is a schematic view of the principles of the radiation inspection system according to an embodiment of the present disclosure, in which the beam modulating device is in a second operational state.
Figure 2:
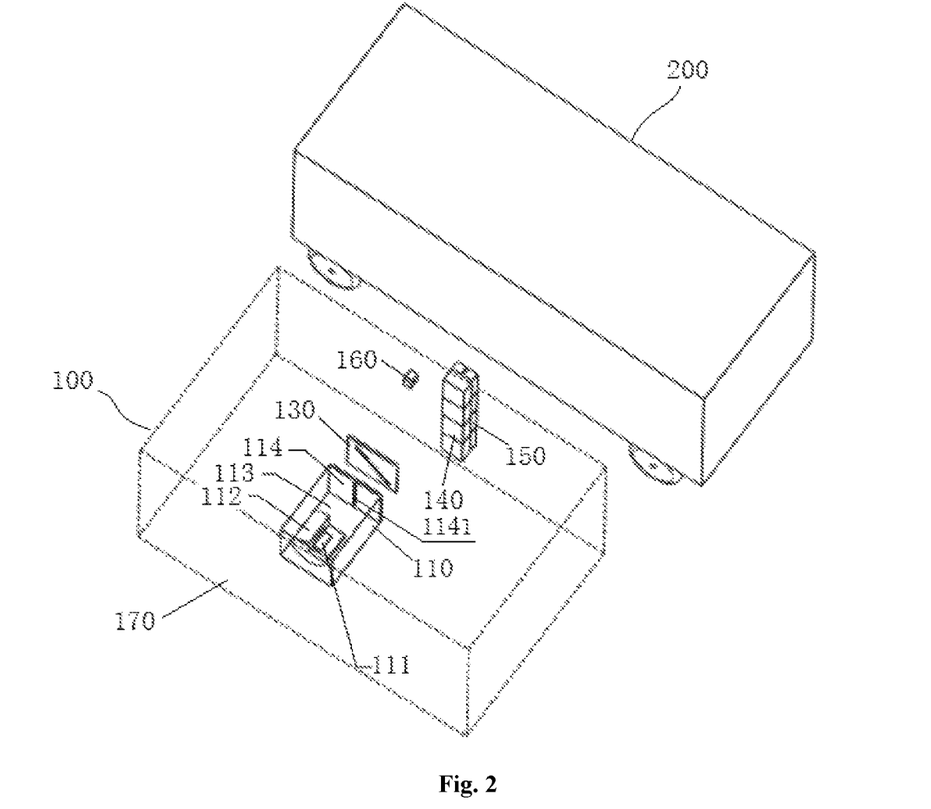
FIG. 2 is a schematic structural view of the radiation inspection system according to an embodiment of the present disclosure.
Figure 5:
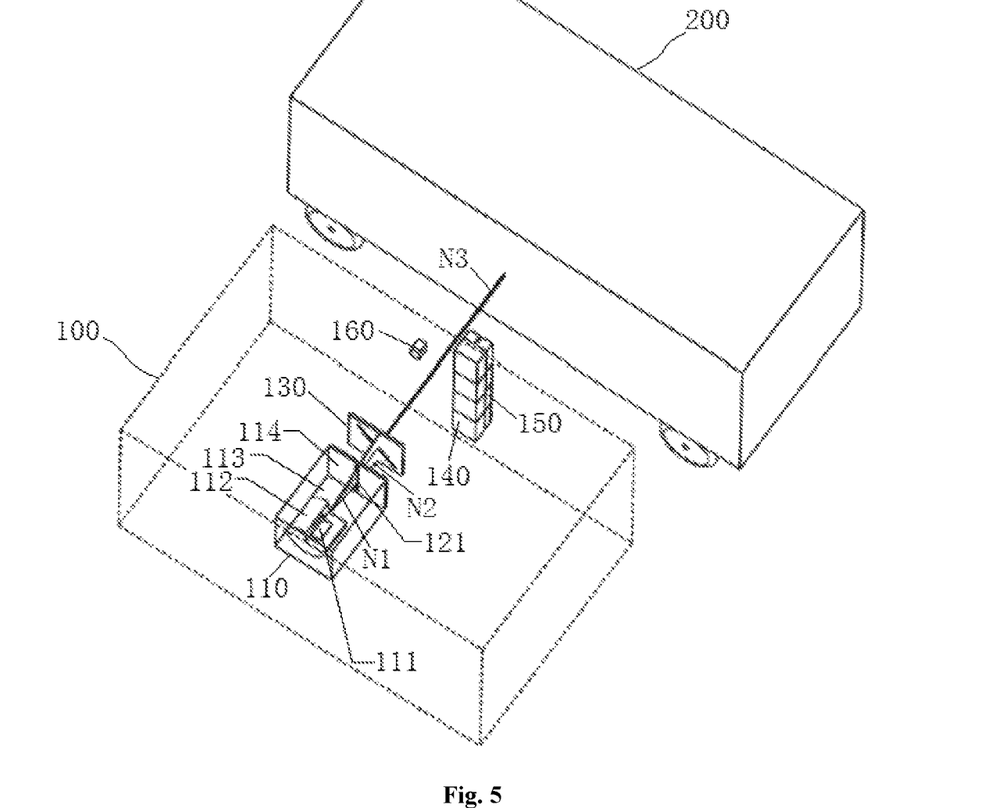
FIG. 5 is a schematic structural view of the radiation inspection system shown in FIG. 2, in which the beam modulating device is in a second operational state.

As shown in FIG. 1, FIG. 2 and FIG. 5, in the radiation inspection system 100 of the present embodiment, the beam modulating device comprises a first collimating structure 114 disposed at a beam exit side of the radiation source and a second collimating structure 130 disposed at a beam exit side of the first collimating structure 114. The first collimating structure 114 comprises a first collimating port 1141, and the second collimating structure 130 comprises a second collimating port 131. The second collimating structure 130 is movably provided with respect to the first collimating structure 114 to change a relative position of the first collimating port 1141 with the second collimating port 113, such that the beam modulating device is shifted between a first operational state and a second operational state.

In the first operational state, the beam modulating device may modulate the initial beam N1 into the fan beam N2, so that it is possible to make the radiation inspection system 100 work under the fan beam scanning inspection mode to realize rapid detection of the inspected object. The fan beam scanning mode is especially suitable for positioning a suspected area. In the second operational state, the beam modulating device may modulate the initial beam N1 into the pencil beam N3, so that it is possible to make the radiation inspection system 100 work under the pencil beam scanning inspection mode to realize accurate detection of the inspected object, so that it is suitable for accurate detection of a suspected area.

As shown in FIGS. 1 to 5, in this embodiment, the first collimating structure 114 comprises a first collimating plate; and the second collimating structure 130 comprises a second collimating plate. Wherein, the first collimating plate is parallel to the second collimating plate.

In this embodiment, the first collimating port 1141 is a straight-linear collimating slit; and the second collimating port 131 is a straight-linear collimating slit.

In this embodiment, the second collimating port 131 is disposed obliquely with respect to the first collimating port 1141. In the first operational state, the second collimating structure 130 is entirely located outside the fan beam N2 emerging from the first collimating port 1141. By translating the second collimating structure 130, the second collimating port 131 may be moved to a position intersecting with the first collimating port 1141, thereby bringing the beam modulating device into the second operational state. In the second operational state, the second collimating structure 130 is translated with respect to the first collimating structure 114 so that it is possible to change an intersecting position of the second collimating port 131 and the first collimating port 1141 in a direction perpendicular to an exit direction of the initial beam N1, thereby changing an exit position of the pencil beam N3.

Figure 3:
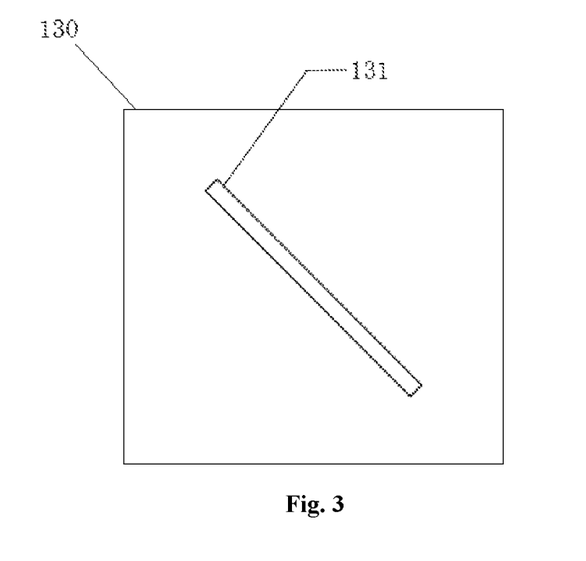
FIG. 3 is a schematic structural view of a second collimating structure of the beam modulating device in the radiation inspection system shown in FIG. 2.

As shown in FIG. 2, in this embodiment, the first collimating port 1141 of the first collimating structure 114 is vertically disposed. The initial beam N1 emitted from the neutron source 111 after passing through the first collimating port 1141 is modulated a fan beam N2. As shown in FIG. 3, the second collimating port 131 of the second collimating structure 130 is disposed obliquely with respect to a horizontal plane, and the first collimating port 1141 and the second collimating port 131 form an acute angle. In this embodiment, the second collimating structure 130 is parallel to the first collimating structure 114, and the second collimating structure 130 is provided such as to be horizontally movable along a direction parallel to the first collimating structure 114.

Wherein, the beam modulating device may comprise a driving mechanism that is drivingly connected with the second collimating structure 130 for realizing the movement required by the second collimating structure 130. The drive mechanism may be coupled to the controller so as to act in accordance with a control command issued by the controller.

Figure 4:
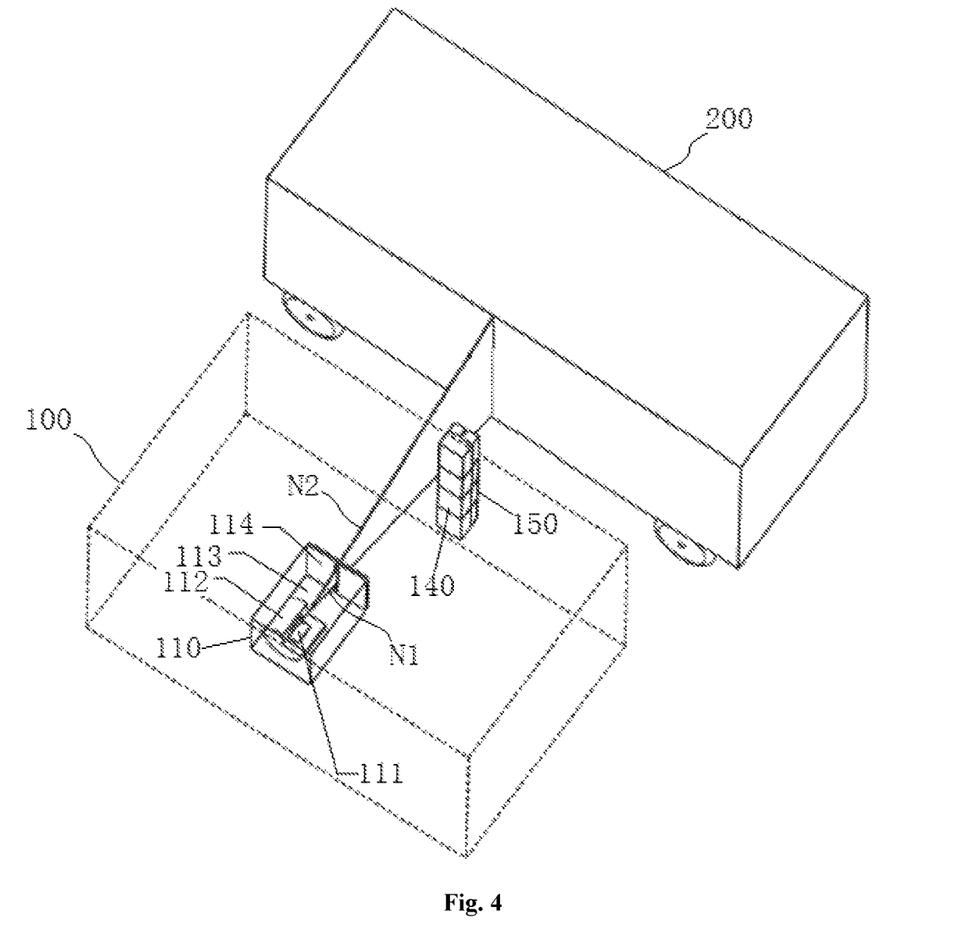
FIG. 4 is a schematic structural view of the radiation inspection system shown in FIG. 2, in which the beam modulating device is in a first operational state.

As described above, when the second collimating structure 130 is located outside the fan beam N2 emerging from the first collimating port 1141, the collimating structure is in the first operational state. As shown in FIG. 4 (since the second collimating structure 130 does not produce a collimating effect at this time, the second collimating structure 130 is not shown in FIG. 4), the first collimating structure 114 after modulating the initial beam N1 outputs the fan beam N2 which scans the inspected subject and enters the inspected object within the inspected subject. Preliminary scanning of the entire inspected subject is completed by the relative movement of the radiation inspection system 100 and the inspected subject.

When the second collimating structure 130 moves to the position where the first collimating port 1141 to intersect with the second collimating port 131, the fan beam N2 forms a pencil beam N3 under the modulation of the second collimating port 131, and the pencil beam N3 is emitted towards the inspected subject. By adjusting the horizontal position of the second collimating structure 130, on one hand, the beam modulating device may be shifted between the first operational state and the second operational state, and on the other hand, in the second operational state, the pencil beam N3 may be adjusted in position. In the present embodiment, the pencil beam N3 may be changed in the vertical position in the case where the horizontal position is unchanged, thereby more accurately scanning the inspected subject, so as to more accurately locate the position of the suspected object and the composition of the suspected object.

Both the first collimating structure 114 and the second collimating structure 130 may be in other forms. For example, the first collimating structure 114 and the second collimating structure 130 may each be a curved plate, which is, for example, an arc-shaped plate. Also for example, the second collimating port 131 of the second collimating structure 130 may be perpendicular to the first collimating port 1141, and the collimating structure is realized to shift between the first operational state and the second operational state and the pencil beam is realized to be adjusted in the beam emitting position in the second operational state in such manner that the second collimating structure 130 is translated longitudinally.

Still for example, a third collimating port may be provided on the second collimating structure 130. When the second collimating structure 130 moves to the third collimating port to be parallel to the first collimating port 1141, the beam modulating device may also be made in the first operational state.

For another example, in the case where the first collimating structure is a first collimating flat plate provided with a straight-linear collimating slit as a first collimating port, and the second collimating structure is a second collimating flat plate provided with a straight-linear collimating slit as a second collimating port, it is also possible that the collimating structure is realized to shift between the first operational state and the second operational state and the pencil beam is realized to be adjusted in the beam emitting position in the second operational state in such manner that the first collimating flat plate rotates relative to the second collimating flat plate.

Of course, the modulation function of the beam modulating device may also be implemented in steps, for example, the beam modulating device may be realized to be shifted between the first operational state and the second operational state in a relative rotation manner, while the pencil beam may be realized to be adjusted in the beam emitting position in a relative translation manner. The adjustment of the beam exit position; or vice versa, the beam modulating device is realized to be shifted between the first operational state and the second operational state in a relative translation manner, while the pencil beam realized to be adjusted in the beam emitting position in a relative rotation mode. In addition, the relative movement between the first collimating structure and the second collimating structure may also be achieved by a compound movement of translation and rotation to achieve the modulation function of the beam modulating device.

In addition, in the above embodiment, the first collimating structure 114 is stationary, and the second collimating structure 130 is movably arranged. In some embodiments not shown, it may also be that the first collimating structure is movably arranged and the second collimating structure is stationary. For example, the first collimating structure may be configured to comprise a first collimating slit that is inclined with respect to the horizontal surface, while the second collimating structure may be configured to comprise a vertical second collimating slit. When the first collimating structure is extracted from the radiation path of the initial beam, the fan beam is emitted from the emitting beam exit side of the second collimating structure such that the beam modulating device is in the first operational state. The first collimating structure moves to the position where the first collimating slit intersects with the second collimating slit, so that a pencil beam is emitted from the emitting beam exit side of the second collimating structure and the beam modulating device is in the second operational state. In the second operational state, the pencil beam may be realized to be changed in position also by moving the first collimating structure.

Of course, in some embodiments not shown, both the first collimating structure and the second collimating structure may also be movably arranged to effectuate shifting the beam modulating device between the first operational state and the second operational state and effectuate changing the position of the pencil beam in the second operational state.

As shown in FIGS. 1 to 5, the detection device comprises a first detecting module 140 for receiving photons R scattered by the inspected object 210 by the scanning beam, and the controller is coupled with the first detecting module 140 for receiving the first detection signal from the first detecting module 140 and forming a first inspection result according to the first detection signal. Among them, the controller is not shown in FIGS. 1 to 5.

In this embodiment, the first detecting module 140 comprises a plurality of first detectors, which are arranged lateral to the fan beam N2 to form a first detector array. In the present embodiment, corresponding to the longitudinal beam emitting of the fan beam N2, the plurality of first detectors are vertically arranged. The first detector may be, for example, a NaI crystal detector.

The detection device further comprises a first detecting module foreground collimating structure 150 for forming the beam shape of the photons R entering the first detecting module 140.

In this embodiment, the detection device further comprises a second detecting module 160 for receiving the photons R scattered by the inspected object 210 radiated by the scanning beam, and the controller is coupled with the second detecting module 160 to receive the second detection signal from the second detecting module 160 to form a second inspection result according to the second detection signal, and the energy resolution of the second detecting module 160 is better than that of the first detecting module 140.

In this embodiment, the second detecting module 160 comprises a second detector. In an embodiment not shown, the second detector module 160 may also comprise a plurality of second detectors which are arranged lateral to the fan beam N2 to form a second detector array. The second detecting module 160 in this embodiment has an energy resolution better than the first detecting module 140. The second detector may for example be a high purity helium detector. The provision of the second detecting module 160 facilitates more accurate inspection.

In an embodiment not shown, the detection device may also comprise a second detecting module foreground collimating structure for forming the beam shape of the photons R entering the second detecting module 160.

In addition, as shown in FIGS. 2, 4, and 5, the radiation inspection system of the present disclosure may comprise a housing 170 in which the radiation source and the beam modulating device of the radiation inspection system 100 are disposed. The detecting module may be disposed within the housing 170, or may also be disposed outside the housing 170, for example, may be disposed on the housing 170.

As shown in FIG. 1 to FIG. 5, in the present embodiment, the inspection process of the radiation inspection system 100 will be described by taking as an example the radiation inspection system 100 inspecting the container 200 to be inspected as the inspected subject.

The neutron source 111 produces photoneutrons, which are moderated to become thermal neutrons. The shield layer 113 shields the neutrons other than in the beam direction, such that the radiation source device 110 emits the initial beam N1 only from the neutron exit port. If the neutron source 111 also generates other rays whilst producing neutrons, the shielding layer 113 may also function to shield other rays.

The beam modulating device is placed in the first operational state. At this time, the fan beam N2 is emitted after the first collimating structure 114 modulates the initial beam N1. The fan beam N2 passes through the container wall of the container 200 to be inspected into the inside of the container 200 to be inspected, and is irradiated onto the inspected object 210. After reacting with the inspected object 210, the photons R containing characteristic γ rays are released. The photons R are collimated by the first detecting module foreground collimating structure 150 to form a photon beam. The photon beam enters the first detecting module 140. The first detecting module 140 detects characteristic γ rays in the photons R to form a first detection signal. The controller forms a first inspection result according to the first detection signal. According to the first inspection result, it may be judged whether or not there is an area to be suspected with potential contraband within the container 200 to be inspected.

After detection by the first detecting module 140, if it is found that there is an area to be suspected with contraband according to the first inspection result, the area to be suspected may be more accurately detected. This embodiment assumes that the area in which the inspected object 210 is situated is an area to be suspected.

The beam modulating device is placed in the second operational state. At this time, the fan beam N2 is emitted after the first collimating structure 114 modulates the initial beam N1, and then a pencil beam N3 having a variable position is formed after the second collimating structure 130 modulates the fan beam N2. In this embodiment, by moving the position of the second collimating structure 130 horizontally, the second collimating port 131 of the second collimating structure 130 may further collimate the fan beam N2 after passing through the first collimating port 1141 of the first collimating structure 114 into the pencil beam N3. In the case where the horizontal position of the pencil beam N3 is constant, the vertical position of the pencil beam N3 is changed, and more accurate scanning is performed to more accurately locate the position of the suspected object. The pencil beam N3 after entering the inspected object 210 reacts with the inspected object 210 to release characteristic γ rays. The second detecting module 160 having better energy resolution detects the characteristic γ rays in the photons R scattered by the inspected object 210 to form a second detection signal. The controller forms a second inspection result according to the second detection signal. According to the second inspection result, the positions of the potential contraband may be more accurately located, and the elements of the potential contraband may be more accurately analyzed.

When operating under the fan beam scanning inspection mode, the second detecting module 160 may perform detection simultaneously with the first detecting module 140, or the first detecting module 140 may also perform detection separately. Upon accurate scanning, the second detecting module 160 may perform detection simultaneously with the first detecting module 140, or the first detecting module 160 may also perform detection separately. In addition, if the accuracy of the detector is adequate, it is also possible to provide only one group of detectors.

In some embodiments, in the second operational state of the beam modulating device, the second detecting module 160 is fixed in position with respect to the pencil beam N3 in the detecting process, that is, the second detecting module 160 moves synchronously with the pencil beam. Since the detector having high-energy resolution has a higher price, the configuration may realize accurate scanning using as few second detectors as possible, so that it is possible to reduce the system cost.

The embodiment of the present disclosure provides a radiation inspection method for inspecting an inspected subject by using the radiation inspection system 100 described above. The radiation inspection method comprises: placing the beam modulating device in a first operational state, and scanning the inspected subject by using the fan beam N2 to determine a suspected area to be accurately inspected; and placing the beam modulating device in a second operational state, and accurately scanning the suspected area by using the pencil beam N3.

Wherein, in the first operational state, the second detecting module 160 may perform detection simultaneously with the first detecting module 140, or the first detecting module 140 may also perform detection separately. In the second operational state, the second detecting module 160 may perform detection simultaneously with the first detecting module 140, or the second detecting module 160 may also perform detection separately.

In the radiation inspection system 100 and the radiation inspection method of the above embodiments of the present disclosure, the first inspection result is obtained by performing fan beam scanning of the inspected subject, so as to determine an area to be suspected. If an area to be suspected is found, the area to be suspected is further accurately scanned by pencil beam scanning, so as to increase the accuracy of substance identification.

The embodiment of the present disclosure may perform substance identification for organics within large containers and large vehicles, and discriminate potential contraband such as drugs or explosives, so that it is of great significance for safety inspection. In some embodiments, by perform substance identification using the characteristic γ rays produced by the reaction of the neutrons and the substances, the elemental composition of the organics may be obtained, thereby distinguishing whether it is a drug, an explosive or a general organic, with high accuracy.

Finally, it should be noted that: the aforementioned embodiments are only used to describe the technical solution of the present disclosure rather than forming the same; although detailed explanations are made to the present disclosure by referring to embodiments, a common technical person in the art should understand that: it is still possible to make amendments to the embodiments of the present disclosure or make equivalent replacements to part of the technical features, they should all be covered in the scope of the technical solution for which protection is sought in the present disclosure.

What is claimed is:

1. A radiation inspection system, comprising:
a radiation source for emitting an initial beam and a beam modulating device for modulating the initial beam into a scanning beam, wherein the beam modulating device comprises a first collimating structure disposed at a beam exit side of the radiation source and a second collimating structure disposed at a beam exit side of the first collimating structure, the first collimating structure comprises a first collimating port, the second collimating structure comprises a second collimating port, the second collimating structure is movable relative to the first collimating structure to change a relative position of the first collimating port with the second collimating port, wherein the beam modulating device is shifted between a first operational state in which the beam modulating device modulates the initial beam into a fan beam, and a second operational state in which the beam modulating device modulates the initial beam into a pencil beam variable in position.

2. The radiation inspection system according to claim 1, wherein in the second operational state, the second collimating structure is translatable and/or rotatable relative to the first collimating structure to change an intersecting position of the second collimating port and the first collimating port in a direction perpendicular to an exit direction of the initial beam, thereby changing a position of the pencil beam.

3. The beam modulating device according to claim 1, wherein the first collimating structure comprises a first collimating plate; and the second collimating structure comprises a second collimating plate.

4. The radiation inspection system according to claim 3, wherein the first collimating plate is a first flat collimating plate, and the second collimating plate is a second collimating flat plate; or, the first collimating plate is a first collimating curved plate, and the second collimating plate is a second collimating curved plate.

5. The radiation inspection system according to claim 3, wherein the first collimating plate is parallel to the second collimating plate.

6. The radiation inspection system according to claim 1, wherein the first collimating port is a first collimating slit; and the second collimating port is a second collimating slit.

7. The radiation inspection system according to claim 1, wherein at least one of the first collimating slit and the second collimating slit is a straight-linear collimating slit.

8. The radiation inspection system according to claim 7, wherein the second collimating slit is disposed obliquely or vertically with respect to the first collimating slit.

9. The radiation inspection system according to claim 1, wherein:
the first collimating structure is stationary, and the second collimating structure is movably disposed; or,
the first collimating structure is movably disposed, and the second collimating structure is stationary; or
the first collimating structure and the second collimating structure are movably disposed.

10. The radiation inspection system according to claim 1, wherein the radiation source comprises a neutron source.

11. The radiation inspection system according to claim 10, wherein the neutron source comprises a photoneutron source.

12. The radiation inspection system according to claim 10, wherein the radiation inspection system further comprises a neutron modulating mask, which is disposed on the periphery of the neutron source, to modulate neutrons generated by the neutron source.

13. The radiation inspection system according to claim 12, wherein the neutron modulating mask comprises a moderating layer, which is disposed at the periphery of the neutron source to moderate the neutrons produced by the neutron source.

14. The radiation inspection system according to claim 13, wherein the neutron modulating mask comprises a shielding layer, shielding layer is disposed at the periphery of the moderating layer and comprises a shielding portion that shields the moderated neutrons and a neutron exit port that is disposed on the beam exit side for emitting the initial beam.

15. The radiation inspection system according to claim 1, comprising a detection device and a controller, wherein the detection device is configured to receive photons scattered by an inspected object radiated by the scanning beam, and the controller is coupled to the detection device to receive a detection signal from the detection device and form an inspection result according to the detection signal.

16. The radiation inspection system according to claim 15, wherein the detection device comprises a first detecting module and a second detecting module having an energy resolution higher than the first detecting module, wherein the first detecting module and the second detecting module are configured to receive the photons scattered by the inspected object radiated by the scanning beam; the controller is coupled to the first detecting module to receive a first detection signal from the first detecting module and form a first inspection result according to the first detection signal; the controller is also coupled to the second detecting module to receive a second detection signal from the second detecting module and to form a second inspection result according to the second detection signal.

17. The radiation inspection system according to claim 16, wherein the detection device comprises a first detecting module foreground collimating structure for forming a beam shape of the photons entering the first detecting module; and/or the detection device comprises a second detecting module foreground collimating structure for forming a beam shape of the photons entering the second detecting module.

18. The radiation inspection system according to claim 16, wherein in the second operational state, the second detecting module is fixed in position with respect to the pencil beam in a detecting process.

19. A radiation inspection method, for inspecting an inspected subject by using the radiation inspection system according to claim 1, comprising:
placing the beam modulating device in a first operational state, and scanning the inspected subject by using the fan beam to determine a suspected area to be accurately inspected; and
placing the beam modulating device in a second operational state, and accurately scanning the suspected area by using the pencil beam.

20. The radiation inspection method according to claim 19, wherein the radiation inspection system comprises a first detecting module and a second detection having an energy resolution higher than the first detecting module, and the radiation inspection method comprises:
in the first operational state, the first detecting module detects separately, or the first detecting module and the second detecting module detect simultaneously to determine the suspected area;
in the second operational state, the second detecting module detects separately, or the first detecting module and the second detecting module detect simultaneously to accurately inspect the suspected area.

* * * * *